US012787949B2

(12) United States Patent
Leis et al.

(10) Patent No.: US 12,787,949 B2
(45) Date of Patent: Nov. 10, 2026

(54) TURF MAINTENANCE IMPLEMENT WITH RELEASABLE TOOL HOUSING FOR INTERCHANGEABLE ROTARY TOOLS

(71) Applicant: Harper Industries, Inc.

(72) Inventors: Casey A. Leis, Cheney, KS (US); Adam P. Meng, Garden Plain, KS (US)

(73) Assignee: Harper Industries, Inc.

( * ) Notice: Subject to any disclaimer, the term of this patent is extended or adjusted under 35 U.S.C. 154(b) by 322 days.

(21) Appl. No.: 18/432,421

(22) Filed: Feb. 5, 2024

(65) Prior Publication Data

US 2024/0263411 A1 Aug. 8, 2024

Related U.S. Application Data

(60) Provisional application No. 63/483,376, filed on Feb. 6, 2023.

(51) Int. Cl.
*A01G 20/43* (2018.01)
*E01H 1/04* (2006.01)

(52) U.S. Cl.
CPC ............ *A01G 20/43* (2018.02); *E01H 1/045* (2013.01)

(58) Field of Classification Search
CPC .......... A01B 45/02; A01D 7/00; A01G 20/43; A01G 20/30; A01G 20/47; E01H 1/045
See application file for complete search history.

(56) References Cited

U.S. PATENT DOCUMENTS 3,306,370 A 2/1967 Heth et al.
4,179,770 A 12/1979 Nunes, Jr.
4,597,203 A * 7/1986 Middleton ............ E01H 1/0809 239/289
4,737,067 A 4/1988 Samejima et al.
4,882,898 A 11/1989 Samejima et al.
6,945,021 B2 * 9/2005 Michel .................. A01D 42/00 56/249
7,163,067 B2 * 1/2007 Job ...................... A01B 59/042 172/540
7,500,284 B2 3/2009 Zylstra
7,600,363 B2 10/2009 Porter et al.
(Continued)

FOREIGN PATENT DOCUMENTS

CN 202889893 U 4/2013

*Primary Examiner* — Robert E Pezzuto
(74) *Attorney, Agent, or Firm* — AVEK IP, LLC; Kent R. Erickson

(57) ABSTRACT

A turf maintenance implement for collecting landscape debris from the ground includes a frame, a hopper assembly mounted to the frame, a debris loading duct, a rotary tool housing, and a drive assembly. The debris loading duct is connected to the frame and is in communication with the hopper assembly. The debris loading duct includes a first latch portion of at least one manually operable latch mechanism connected thereto. The rotary tool housing includes a rotary tool rotatably mounted thereto, and a second latch portion of the at least one manually operable latch mechanism connected thereto. The rotary tool housing is selectively detachable from the debris loading duct by releasing the first latch portion of the at least one manually operable latch mechanism from the at least one second latch portion. The drive assembly is connectable to a power source and drivingly and releasably connected to the rotary tool.

20 Claims, 10 Drawing Sheets

(56) References Cited

U.S. PATENT DOCUMENTS

| | | | | |
|---|---|---|---|---|
| 7,716,773 | B1 * | 5/2010 | Pahl | A01G 20/43 15/82 |
| 8,899,005 | B2 | 12/2014 | Pavlich et al. | |
| 8,955,188 | B2 * | 2/2015 | Hickenbottom | A01G 20/43 15/82 |
| 2008/0105445 | A1 * | 5/2008 | Dayton | A01C 15/02 56/289 |
| 2024/0032450 | A1 * | 2/2024 | Herlitzius | A01B 79/005 |

* cited by examiner

TURF MAINTENANCE IMPLEMENT WITH RELEASABLE TOOL HOUSING FOR INTERCHANGEABLE ROTARY TOOLS

CROSS REFERENCE TO RELATED APPLICATIONS

This application claims the benefit of U.S. Provisional Patent Application Ser. No. 63/483,376, entitled Turf Sweeper with Releasable Tool Housing for Interchangeable Rotary Tools, filed Feb. 6, 2023, the disclosure of which is incorporated herein in its entirety by reference.

BACKGROUND OF THE INVENTION

Field of the Invention

The present invention relates generally to rotary implements used to maintain or manicure turf including turf at golf courses, parks and for private lawns. More specifically, the invention relates to turf maintenance equipment with a rotary tool housing, in which the tool housing is releasable from the body of the sweeper to facilitate changing of the rotary tool utilized.

BACKGROUND OF THE INVENTION

Golfers prefer playing on well-manicured turf and golf course superintendents strive to provide tee boxes, fairways and greens that are free from debris to provide an enjoyable experience for the golfers. Turf sweepers may be employed to improve the visual aesthetic and overall quality of the playing grounds by removing any unnecessary debris from a given area. These turf sweepers, such as that described in U.S. Pat. No. 11,246,272 assigned to Harper Industries, Inc., may use a rotary broom or brush to remove debris from the surface of the ground and transfer the debris to a receptacle. However, in some applications it may be desirable for the turf maintenance crew to use other rotary tools beyond a rotary brush, such as a flail rotor or a verticut rotor.

SUMMARY OF THE INVENTION

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

According to an embodiment, a turf maintenance implement includes a frame, a hopper assembly mounted to the frame, a debris loading duct, a rotary tool housing, and a drive assembly. The debris loading duct is connected to the frame and is in communication with the hopper assembly. The debris loading duct includes a first portion of at least one releasable, mating connector connected thereto. The rotary tool housing includes a rotary tool rotatably mounted thereto, and a second portion of the at least one releasable, mating connector connected thereto. The rotary tool housing is selectively detachable from the debris loading duct by releasing by releasing the first portion of the at least one releasable, mating connector from the second portion of the at least one releasable, mating connector. The drive assembly is connectable to a power source and drivingly and releasably connected to the rotary tool. The rotary tool may be selected from a group consisting of: a rotary broom, a flail rotor, and a verticut rotor. In one embodiment, the at least one releasable, mating connector comprises a latch and the first latch portion is an over-center latch mechanism and the second latch portion is a catch engageable by the over center latch mechanism. The latch is preferably manually operated.

According to another embodiment, a turf maintenance implement for removing and collecting landscape debris from the ground includes a hopper assembly pivotally connected to a frame, with the hopper assembly being configured to hold landscape debris therein. The turf maintenance implement includes a debris loading duct connected to and in communication with the hopper assembly, the debris loading duct being height-adjustable relative to the frame. The debris loading duct includes a first latch portion of at least one manually operable latch mechanism disposed on a perimeter thereof. The turf maintenance implement further includes a rotary tool housing, which includes a rotary tool rotatably mounted thereto, a flexible skirt extending downwardly along a perimeter thereof, and a second latch portion of the at least one manually-operable latch mechanism disposed on a perimeter thereof. The rotary tool housing is selectively detachable from the debris loading duct by releasing the first latch portion of the at least one manually operable latch mechanism from the at least one second latch portion. The debris loading duct and the rotary tool housing are height-adjustable relative to the frame. The turf maintenance implement also includes a drive assembly connectable to a power source and drivingly and releasably connected to the rotary tool.

According to another embodiment, a method of removing a rotary tool of a turf maintenance implement from a work area includes providing a turf maintenance implement configured to remove landscape debris from the ground. The turf maintenance implement includes a height-adjustable debris loading duct connected to a hopper assembly, the debris loading duct having a first latch portion of at least one manually operable latch mechanism. The turf maintenance implement further includes a rotary tool housing having a rotary tool rotatably mounted thereto, the rotary tool housing having a second latch portion of the at least one manually-operable latch mechanism. The rotary tool housing has a plurality of primary mounting brackets disposed along a front wall thereof, and at least one secondary mounting bracket disposed along a left-hand side and a right-thereof, each of the primary and secondary mounting brackets being configured to hold a roller assembly including a roller. The turf maintenance implement also includes a drive assembly connectable to a power source and drivingly and releasably coupled to the rotary tool. The method includes decoupling the drive assembly from the rotary tool, removing a first roller assembly from a first primary mounting bracket and inserting the first roller assembly into a first secondary mounting bracket, and removing a second roller assembly from a second primary mounting bracket and inserting the second roller assembly into a second secondary mounting bracket. The method further includes positioning the first rotary tool housing such that the rollers of the first roller assembly and the second roller assembly are in contact with the ground before decoupling the first latch portion of the at least one manually operable latch mechanism from the second latch portion of the at least one manually operable latch mechanism and removing the first rotary tool housing from the work area via the first and second roller assemblies.

According to another embodiment, the method further requires providing a second rotary tool housing having a second rotary tool rotatably mounted thereto, the second rotary tool housing having a second latch portion of the at least one manually-operable latch mechanism, a plurality of primary mounting brackets disposed along a front wall thereof, and at least one secondary mounting bracket disposed along a left-hand side and a right-thereof, each of the primary and secondary mounting brackets being configured to hold a roller assembly including a roller. The method includes securing a roller assembly into each of the secondary mounting brackets of the second rotary tool housing and positioning the second rotary tool housing under the debris loading duct such that the first latch portion disposed on the debris loading duct and the second latch portion disposed on the second rotary tool housing are substantially vertically aligned. The method further requires adjusting the height of the debris loading duct such that the debris loading duct abuts the second rotary tool housing, coupling the first latch portion disposed on the debris loading duct with the second latch portion disposed on the second rotary tool housing, and removing each of the roller assemblies from the secondary mounting brackets of the second rotary tool housing and securing each roller assembly into a primary mounting bracket of the second rotary tool housing. The method also includes coupling the drive assembly to the second rotary tool.

BRIEF DESCRIPTION OF THE DRAWINGS

Illustrative embodiments of the present disclosure are described in detail below with reference to the attached drawing figures.

DETAILED DESCRIPTION OF THE PREFERRED EMBODIMENTS

Figure 1:
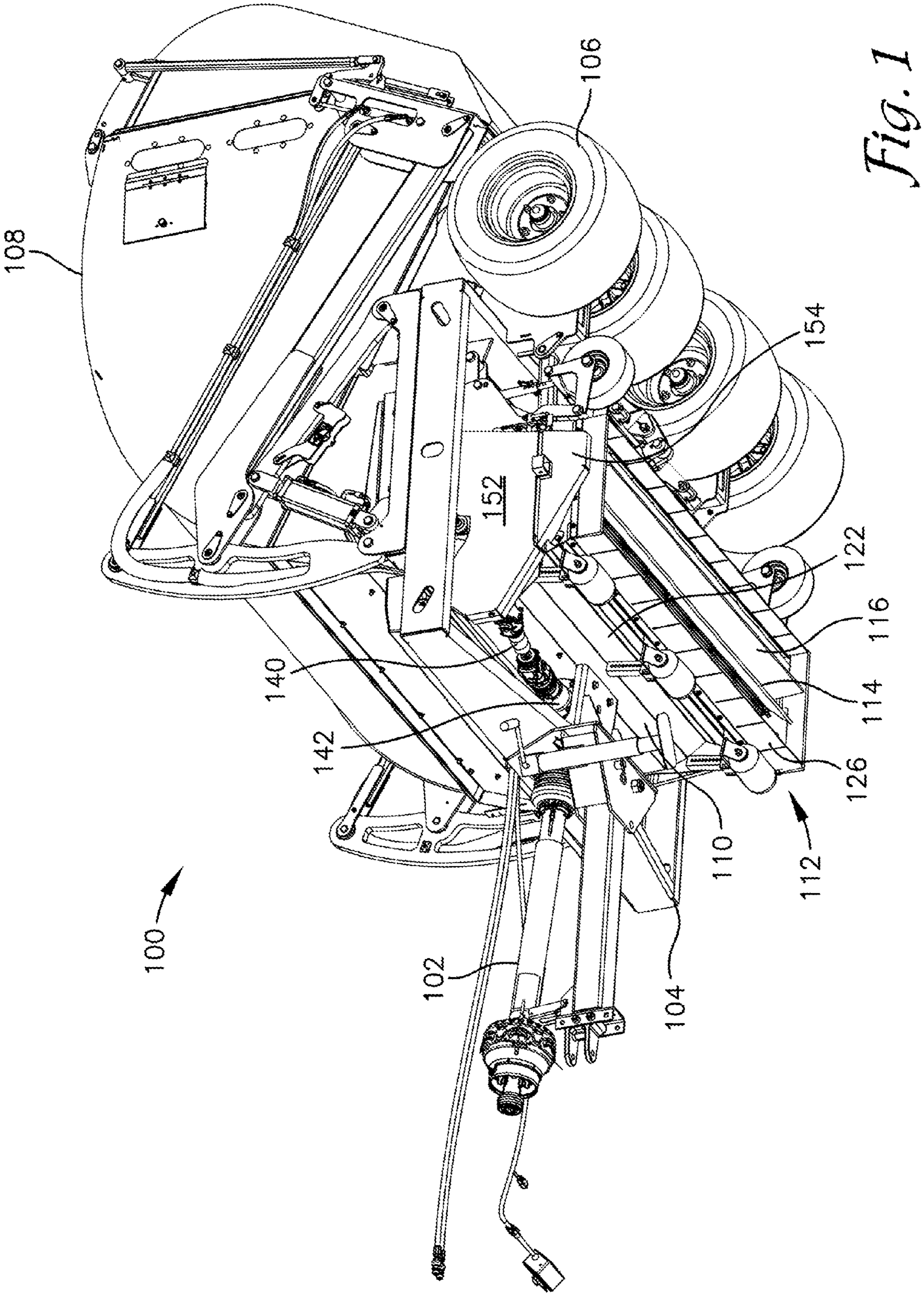
FIG. 1 is a front, left side perspective view of a first embodiment of a turf maintenance implement having an interchangeable tool housing containing a rotary brush.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "leftwardly," and "rightwardly" will refer to directions in the drawings to which the reference is made. The words "inwardly" and "outwardly" will refer to directions toward and away from, respectively, the geometric center of the embodiment being described and designated parts thereof. Said terminology may include the words specifically mentioned, derivatives thereof, and words of a similar import.

Referring to FIG. 1, an embodiment of a turf maintenance implement 100 is shown. The turf maintenance implement 100 shown is a modified version of the turf sweeper described and shown in U.S. Pat. No. 11,246,272 the disclosure of which is incorporated herein by reference. The embodiment of the turf maintenance implement 100 shown herein is configured to be towed behind a tractor or other suitable vehicle and includes a power take-off 102 for providing power to the turf maintenance implement 100. However, in other embodiments, it is foreseen that the turf maintenance implement 100 may be self-propelled or form part of a self-propelled vehicle, which may include additional or alternative power sources for operation of the turf maintenance implement 100. The turf maintenance implement 100 includes a chassis or frame 104 supported by wheels 106. The turf maintenance implement 100 further includes a hopper assembly 108 for the collection of various debris from a desired area, the hopper assembly being pivotally connected to the frame 104 and connected to a debris loading duct 110. A selectively detachable rotary tool housing 112 is removably connected to a lower end of the debris loading duct 110. The debris loading duct 110 is height-adjustable, using a height adjustment means or mechanism, with respect to the frame 104, such that it can be used in a wide variety of applications, and such that the rotary tool housing 112 is also height adjustable since it is connected to the debris loading duct 110.

Figure 2:
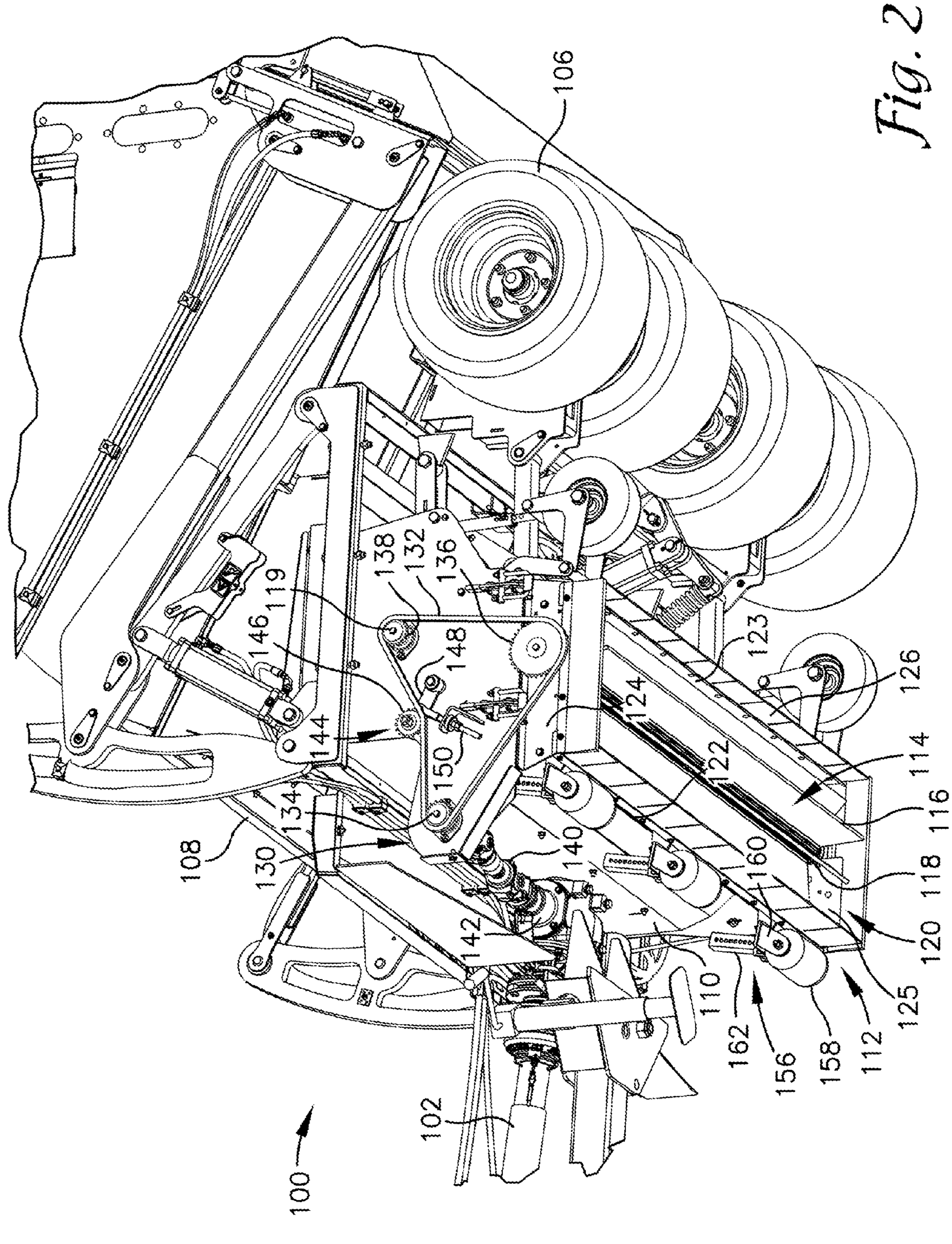
FIG. 2 is an enlarged front, left side perspective view of the turf maintenance implement of FIG. 1 with portions removed to show detail.
Figure 3:
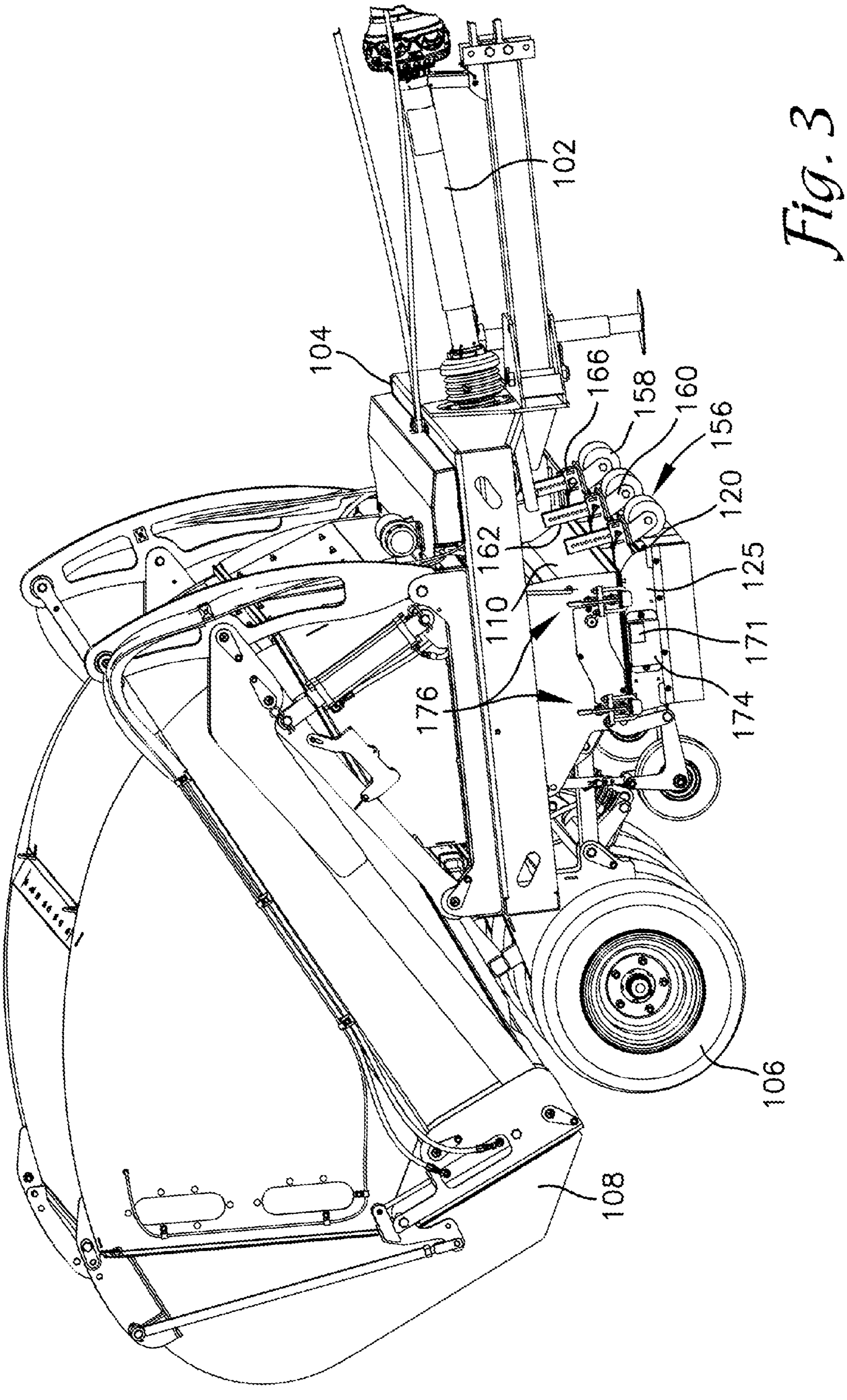
FIG. 3 is an enlarged, right side perspective view of the turf maintenance implement of FIG. 1.

The detachable rotary tool housing 112, shown in FIGS. 2 and 3, includes a rotary tool 114, which in the embodiment shown is a rotary broom or brush 114 (also shown in FIG. 9) which is rotatably mounted within the rotary tool housing 112 and configured to rotate about an axis which is generally perpendicular to the direction of travel. The rotary broom 114 comprises a plurality of bristles or pick-up members 116 which project radially outward from a broom axle 118. The broom 114 extends generally across a width of the detachable rotary tool housing 112 such that the tips of the bristles or pick-up members 116 are positioned to contact and collect debris from the ground. The pick-up members 116 lift the debris upwards into a transfer section of the debris loading duct 110. A paddle rotor (not shown), which may be configured similar to the paddle rotor shown in U.S. Pat. No. 11,246,272, is rotatably mounted within the debris loading duct 110 on a paddle axle 119. Paddles on the paddle rotor engage debris lifted by the rotary broom 114 and lift or fling the debris through the debris loading duct 110 into the hopper assembly 108.

In the embodiment shown, the detachable rotary tool housing 112 is formed as a rectangular frame 120 including front and rear walls or panels 121 and 122 and left and right sidewalls or side panels 123 and 124. The frame 120 is open through the top and bottom. Ends of the tool or broom axle 118 extend through holes (not shown) formed in the left and right side panels 123 and 124 of the frame 120 and are rotatably supported in bearings (not shown) mounted on the side panels 123 and 124. A skirt or curtain 126 extends along and depends from a lower perimeter of the rectangular frame 120 to contain excess debris. The skirt 126 may be fashioned from a flexible or polymeric material.

Referring to FIG. 2, the rotary broom 114 and broom axle 118 and the paddle and paddle axle 119 are driven by a drive assembly 130, disposed on one side (in the illustrated embodiment, the left side) of the frame 104 and the debris loading duct 110. The drive assembly 130 includes a timing belt or chain 132 which is driven by a drive sprocket 134, a broom axle sprocket 136 and a paddle axle sprocket 138. The drive sprocket 134 is driven by a laterally extending drive shaft 140 drivingly connected to the power take-off 102 via a gear box 142. As noted previously, it is foreseen that in some embodiments the drive sprocket 134 may be driven by other power sources, such as an electric or hydraulic motor which form part of alternative embodiments of the drive assembly 130. The drive assembly 130 also includes a chain tensioner assembly 144 including a chain tensioning sprocket 146 which is pivotally mounted on the debris on a pivot arm 148 pivotally mounted on the debris loading duct 110 and selectively pivoted by a chain tensioning actuator 150 connected between the pivot arm 148 and the debris loading duct 110. Pivotally adjusting the position of the chain tensioning sprocket 146 using actuator 150 maintains the desired tension in the chain 132 to ensure proper operation of the rotary broom 114. Releasing tension on the chain 132 allows removal of the chain 132 from around the drive sprocket 134, broom axle sprocket 136 and paddle axle sprocket 138 as needed.

Referring again to FIG. 1, the drive assembly 130 is enclosed within and covered by upper and lower shielding panels or housings 152 and 154 which are removably secured to the debris loading duct 110 and the left side panel 124 of the frame 120 respectively. The upper shielding panel 152 is shown secured to a side wall of the debris loading duct 110 in FIG. 1 and removed therefrom in FIG. 2. The lower shielding panel 154 is shown secured to the left side panel 124 of the detachable tool housing frame 120 in FIG. 1 and removed therefrom in FIG. 2. The upper shielding panel 152 covers the drive sprocket 134, the paddle axle sprocket 138, an upper portion of the broom axle sprocket 136, the chain tensioner assembly 144 and the chain 132 extending therearound. The lower shielding panel 154 covers most of the broom axle sprocket 136 and the chain 132 extending therearound.

Figure 5:
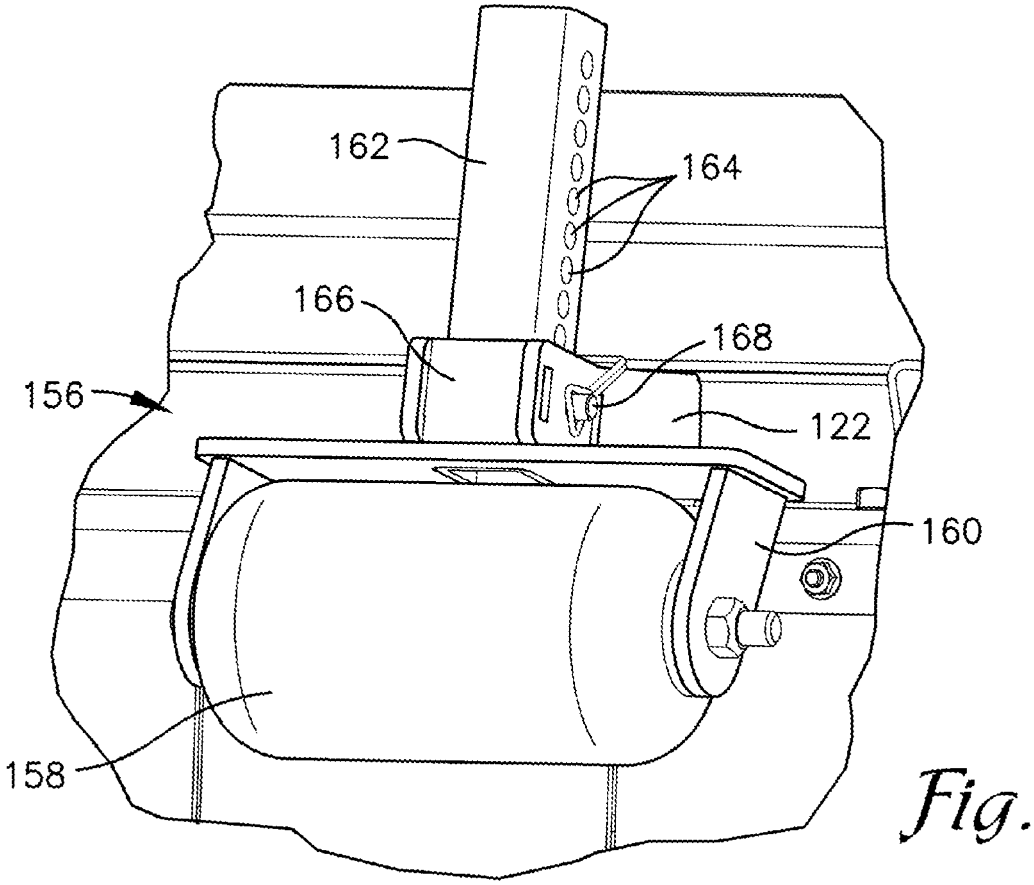
FIG. 5 is an enlarged perspective view of an opposite side of the interchangeable tool housing showing a secondary roller mounting bracket.

Referring to FIGS. 2-3, three anti-scalp roller assemblies 156 are shown adjustably and removably mounted to the front panel 121 of detachable tool housing frame 120. Each of the roller assemblies 156 includes a roller 158 rotatably mounted on a fork 160 connected to a shank or stem 162. A plurality of vertically spaced holes 164 are formed through the shank 162 which allows the roller 158 to be mounted on the front panel 122 at a variety of heights, depending on the application and/or user preference. A plurality of primary mounting brackets 166, three in the embodiment shown, are mounted in spaced relation on the front panel 122 of frame 120. In the embodiment shown, each primary mounting bracket 166 is formed as a receiver with pin receiving holes (not shown) extending through sides of the receiver 166. The receiver 166 is configured to receive and hold the shank 162 of one of the height-adjustable, anti-scalp roller assemblies 156. As shown in FIG. 5, a locking pin 168 inserted through aligned holes in the primary mounting bracket 166 and a selected hole 164 in the shank 162 is used to secure the roller assembly 156 to the associated primary mounting bracket 166 on the front panel 122 of the tool housing frame 120. In a normal, operational configuration the rollers 158 may be mounted such that they are a few inches above the ground, or at least high enough that they are not in continuous contact with the ground while the turf maintenance implement is moving. The primary mounting brackets 166 may in some embodiments, be configured to hold the shank 162 of the roller assemblies 156 in a substantially vertical orientation, while in other embodiments, such as that shown, angularly offset from the vertical at a predetermined angle.

Figure 6:
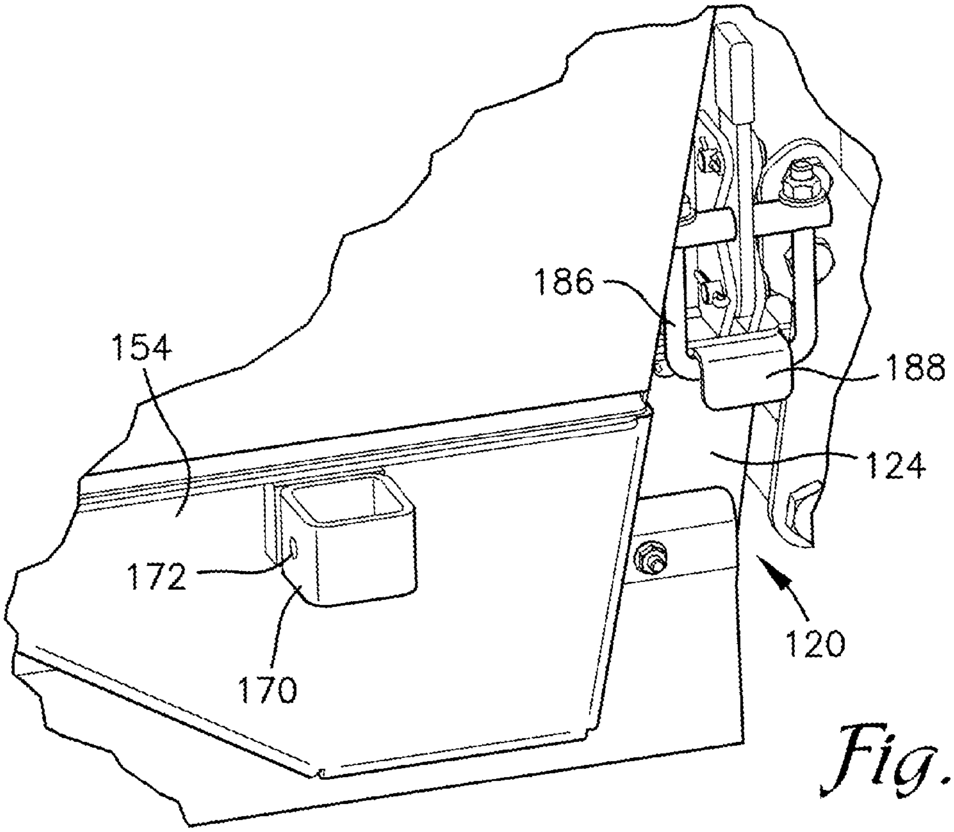
FIG. 6 is an enlarged perspective view of a portion of an interchangeable tool housing showing a primary anti-scalp roller assembly secured to a primary roller mounting bracket.

Secondary roller mounting brackets 170 and 171 are mounted on the sides of the detachable rotary tool housing 112, with one secondary roller mounting bracket 170 and 171 disposed on each side of the rotary tool housing 112. The secondary roller mounting brackets 170 and 171 (as best seen in FIG. 6) are substantially similar in function to the primary mounting brackets 166, and each is configured to receive and hold the shank 162 of one of the anti-scalp roller assemblies 156. The secondary mounting brackets 170 and 171 include pin receiving holes 172 configured to receive a locking pin 168 inserted through the pin receiving holes 172 and an aligned pin receiving hole 173 formed in the shank 162 of the roller assembly 156. In the embodiment shown, the left secondary roller mounting bracket 170 is mounted on the outer surface of the lower shielding panel 154 connected to the left side panel 124 of detachable tool housing frame 120. The right secondary roller mounting bracket 171 is mounted on a shield 174 connected to the right side panel 125 of frame 120 and extending over the bearing (not shown) connecting the broom axle 118 to the right side panel 125 of tool housing frame 120.

Figure 4:
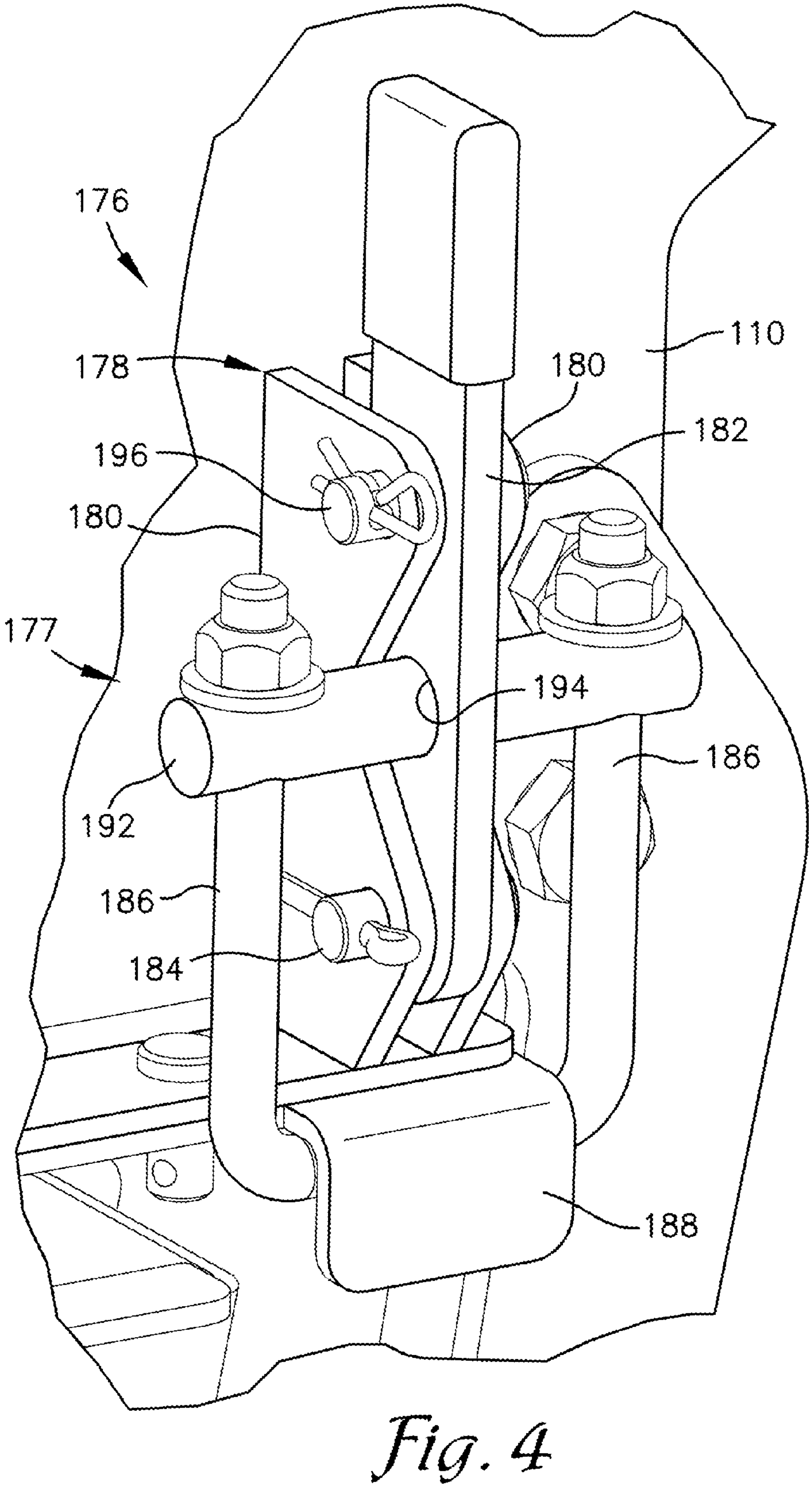
FIG. 4 is a close-up perspective view of a latch mechanism forming part of an interchangeable tool housing.

Referring now to FIG. 4, the rotary tool housing 112 is connected to and suspended from the debris loading duct 110 using a plurality of latch assemblies 176. In the illustrated embodiment, there are two latch assemblies 176 disposed on both the left-hand side and the right-hand side of the debris loading duct 110. The latch assemblies 176 shown each comprise an over-center toggle latch mechanism 177. Various other embodiments not shown may employ a different number of latch mechanisms without departing from the scope of the invention. In the illustrated embodiment, each toggle latch mechanism 177 includes a latch base 178 formed from a pair of spaced apart flanges 180 secured to and projecting from the side of the debris loading duct 110. A lever 182 is pivotally connected to and between the flanges 180 proximate a lower end thereof by pin 184. A latch bail 186 is pivotally connected to the lever 182 generally medially between the ends of the lever 182. Each latch assembly 176 includes a catch 188 with a downwardly projecting lip mounted on and extending outwards from an upper edge of a respective left or right side panel 124 or 125 of the detachable tool housing frame 120. An outwardly opening, V-shaped notch or recess 190 is formed in each of the flanges 180 forming the latch base 178. A base of the latch bail 186 is formed as a laterally extending pin 192 which extends through a hole 194 in the latch lever 182 and allows pivoting of the latch bail 186 relative to the lever 182.

When a distal end of the lever 182 is pivoted upward past vertical the laterally extending pin 192 of bail 186 is pulled into the trough of the V-shaped recesses 190 in the base flanges 180 in an over-centered position. As the lever 182 is pivoted upward and into the over centered position, a lower end or lower cross-member of the latch bail 186 is drawn under the associated catch 188 to draw the catch 188 and attached side panel 124 or 125 of the rotary tool housing 112 upward relative to the debris loading duct 110. When the latch lever 182 is in an over-centered position, a force must be applied to the lever 182 to pivot the lever 182 and laterally extending pin 192 of bail 186 out of the V-shaped recesses 190 and release the latch bail 186 from engaging the catch 188 so that the rotary tool housing 112 can be separated from the debris loading duct 110. To secure the latch lever 182 in the over-centered and latching position, a locking pin 196 may be inserted through aligned holes (not shown) in the latch lever 182 and upper portions of the flanges 180 forming the latch base 178.

Figure 9:
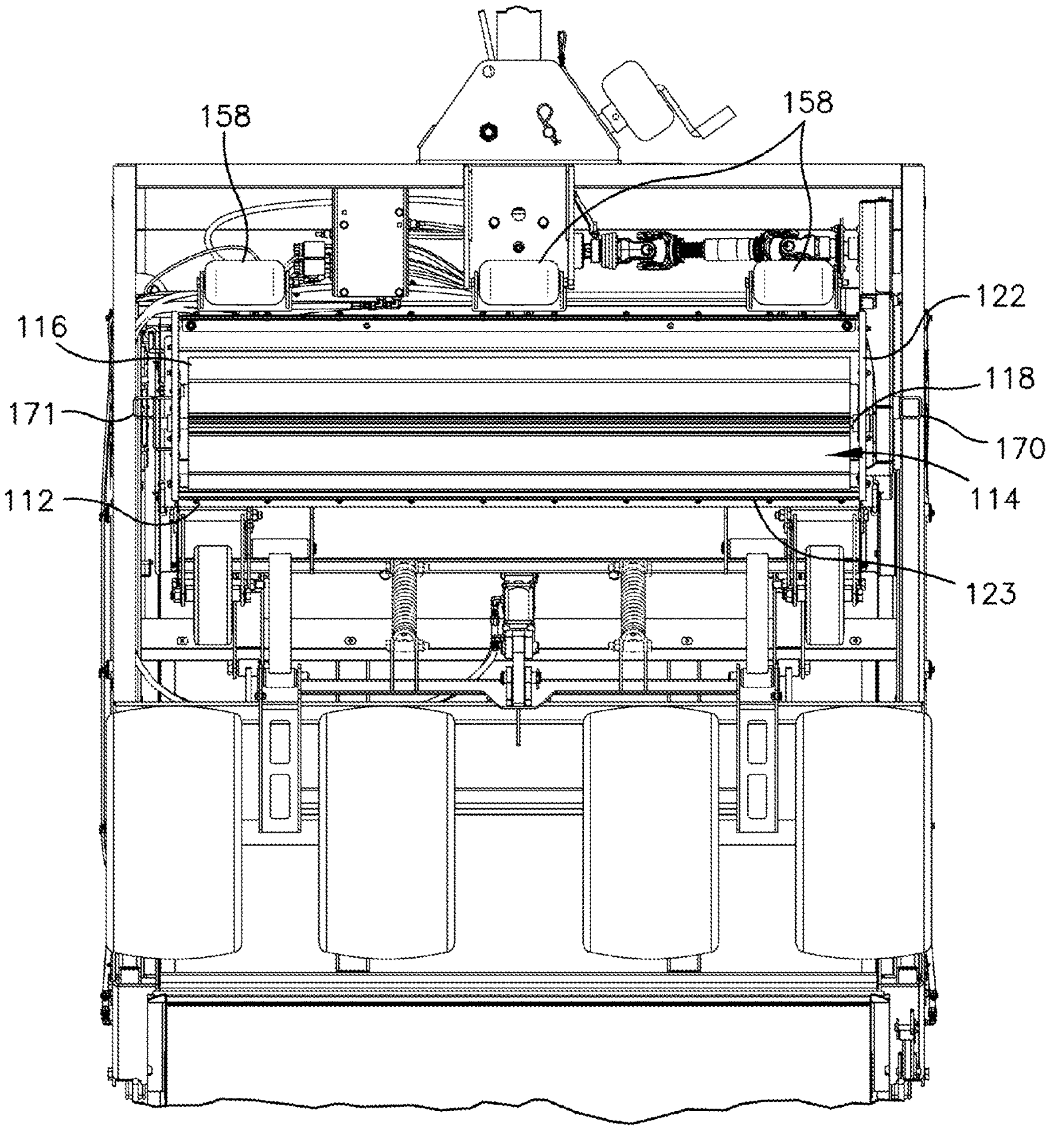
FIG. 9 is a bottom view of the turf maintenance implement shown in FIG. 1.
Figure 10:
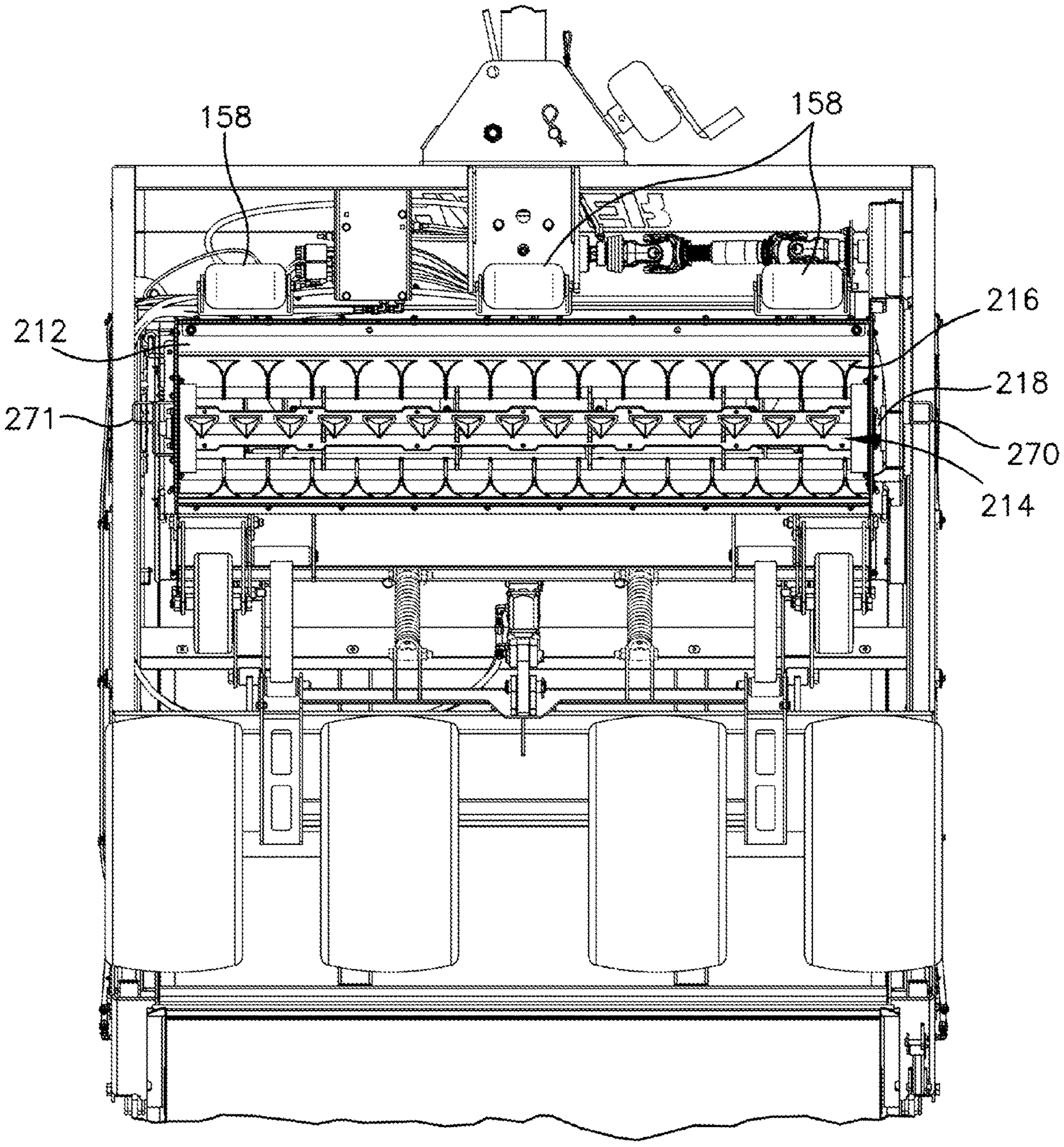
FIG. 10 is a bottom view of a second embodiment of a turf maintenance implement with interchangeable tool housing containing a flail rotor.
Figure 11:
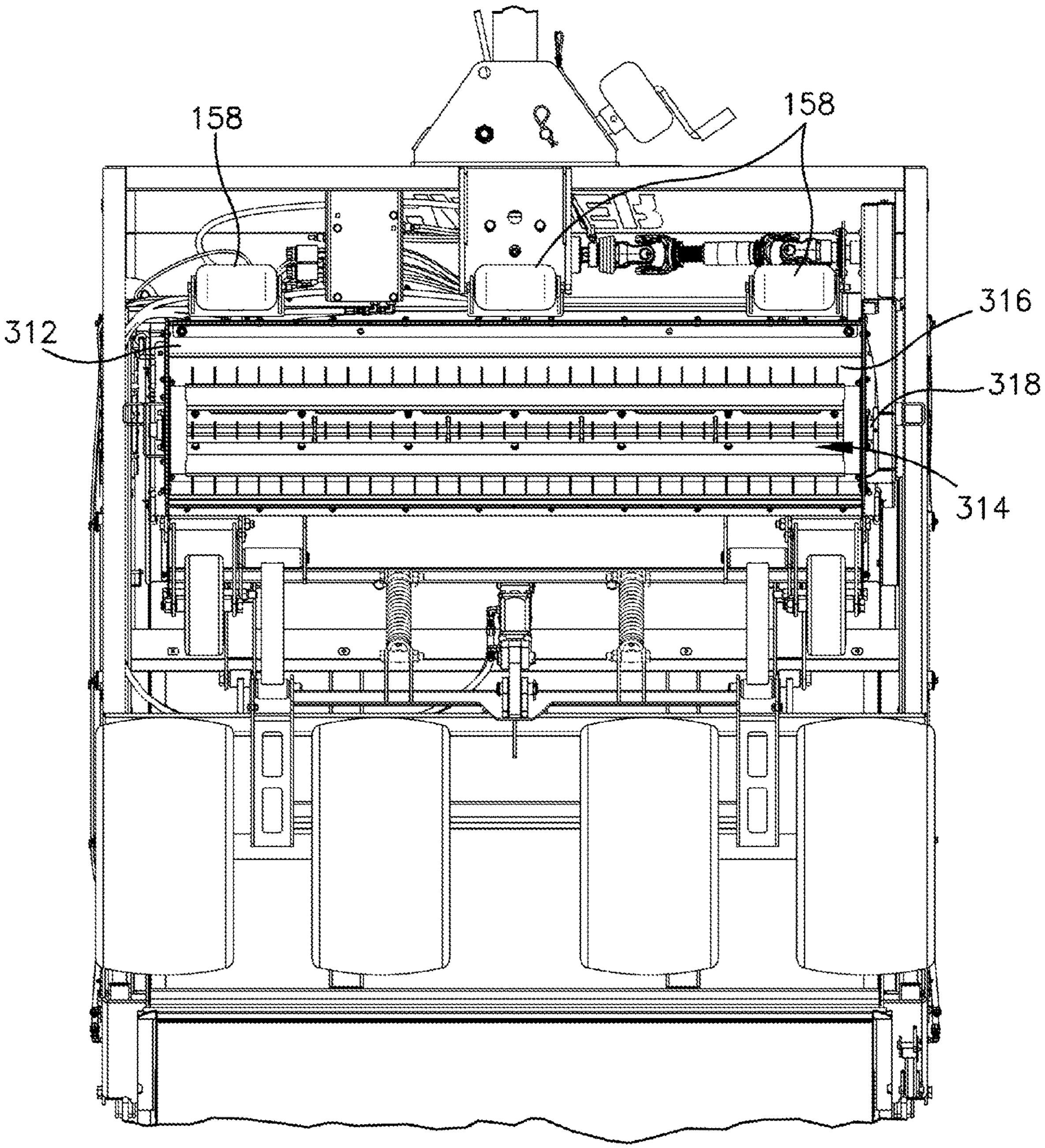
FIG. 11 is a bottom view of a third embodiment of a turf maintenance implement with interchangeable tool housing containing a verticut rotor.

FIGS. 9 through 11 illustrate a variety of rotary tool housing embodiments, housing a variety of rotary tools which may be selectively secured to the turf maintenance implement 100. FIG. 9 shows a rotary broom 114, as described above, having a plurality of bristles or pick-up members 116 which remove debris from the ground below and into the hopper assembly 108 via the debris loading duct 110. FIG. 10 illustrates a second embodiment of a rotary tool housing 212 having a flail rotor 214 secured within the rotary tool housing 212 instead of a rotary broom. The exterior of the rotary tool housing 212 is substantially similar or identical to that of rotary tool housing 112 and includes all the exterior features of rotary tool housing 112. This includes, but is not limited to, the primary and secondary mounting brackets 266 and 270, 271 for mounting the roller assemblies 156 thereto, as well as the catches 188 for engagement by the latch bails 186 of over-center toggle latch mechanisms 177 for securing the rotary tool housing 212 in place relative to the debris loading duct 110 and frame 104. The flail rotor 214 includes a plurality of projections or flail elements 216 extending from a common axle 218, wherein the flail elements 216 are configured to remove debris and/or evenly distribute any remaining debris onto the ground along the length of the rotary tool housing 212.

Similar to FIG. 10, FIG. 11 illustrates a third embodiment of a rotary tool housing 312, having a verticutter or verticut rotor 314. As with rotary tool housing 212, the rotary tool housing 312 shown in FIG. 11 includes all the exterior features of the rotary tool housing 112 shown in FIGS. 1 through 9. The verticutter or verticut rotor 314 includes a plurality of blades 316 which are mounted substantially normal to a rotor axle 318, and are configured to remove debris from the ground and into the hopper assembly 108 via the debris loading duct 110. In the illustrated embodiment, each blade location on the verticut rotor 314 comprises four equally-spaced coaxial blades 316 extending from the axle 318, with the number of blade locations being equally distributed along a length of the axle 318.

The rotary tool housings 112, 212, and 312 with their respective rotary tools, namely broom 114, flail rotor 214, and verticutter 314 respectively, may be used interchangeably with the turf maintenance implement 100, depending on the application or user preference. Compared to existing solutions for changing out the rotary tool, a selected one of the rotary tool housings 112, 212 or 312 with the associated rotary tool can be changed with a limited number of tools and is a straightforward process. The following process is exemplary in nature, and it shall be understood that not all steps described herein must be performed in the order disclosed. Some embodiments may require a different number of steps than the method disclosed, without necessarily departing from the scope of the invention.

When changing between rotary tool housing 112, 212, or 312, the user must stop operation of the turf maintenance implement 100, such that the drive assembly 130 is not engaged. First, the user must remove the drive chain 132 from at least the rotary tool axle sprocket 136 connected to the rotary tool axle 118, 218, or 318. It may be desirable for a user to raise the rotary tool housing 112, 212, or 312 to its maximum height, providing as much ground clearance as possible. To remove the chain 132, the user may have to remove at least the lower shielding panel 154 and in a preferred embodiment, the upper shielding panel 152, such as in FIG. 2 compared to FIG. 1. The lower shielding panel 154 may be removed completely, or may be hinged such that the drive assembly 130 is accessible when the panel 154 is open. To facilitate removing the chain 132, the user may have to reduce the tension in the chain 132. This can be achieved by extending the chain tensioning actuator 150, for example. When sufficient tension has been removed from the chain 132, the user may remove the chain 132 from around the tool axle sprocket 136.

Figure 7:
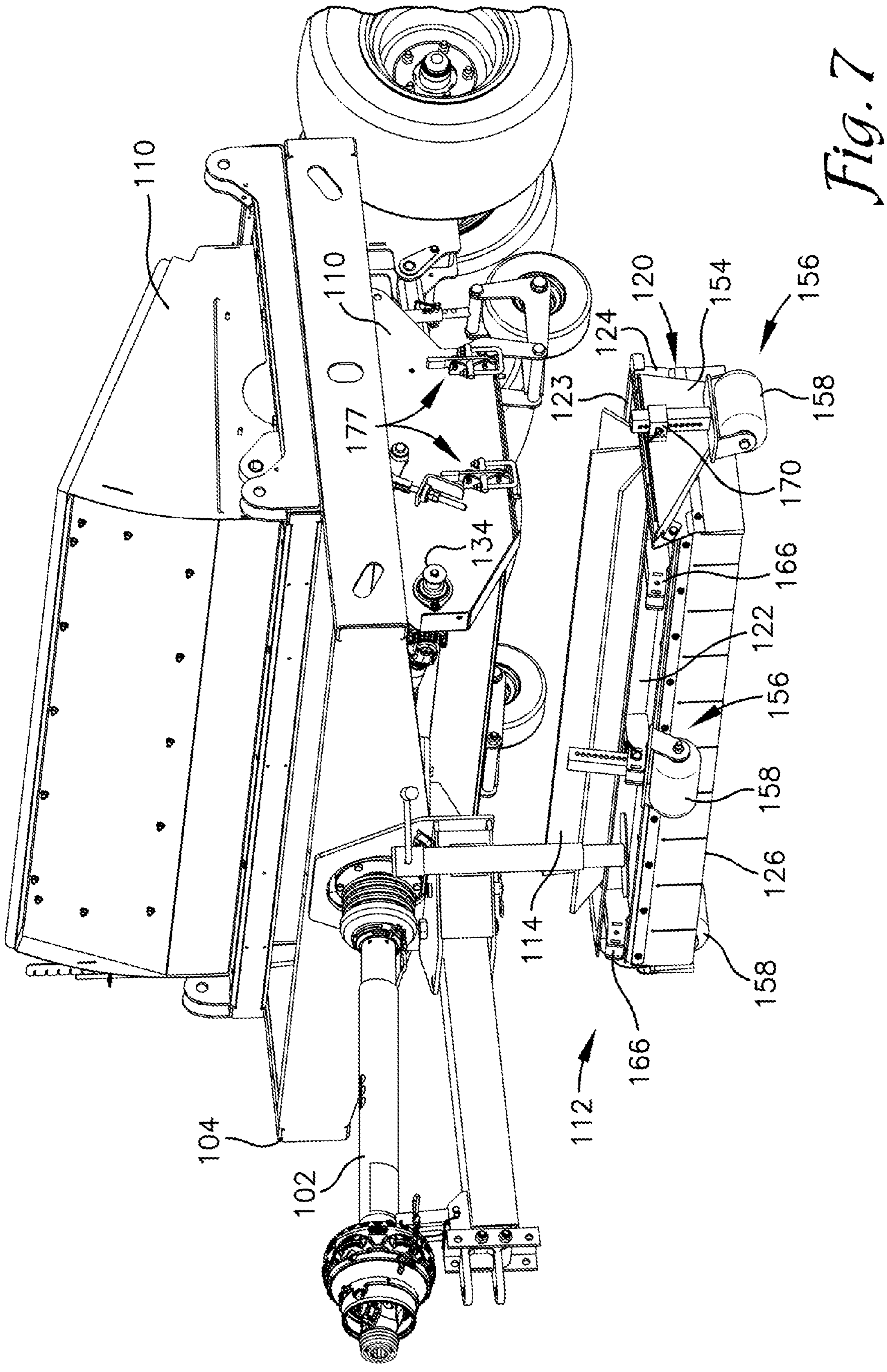
FIG. 7 is an enlarged, fragmentary perspective view of the turf maintenance implement with the interchangeable tool housing in a detached state
Figure 8:
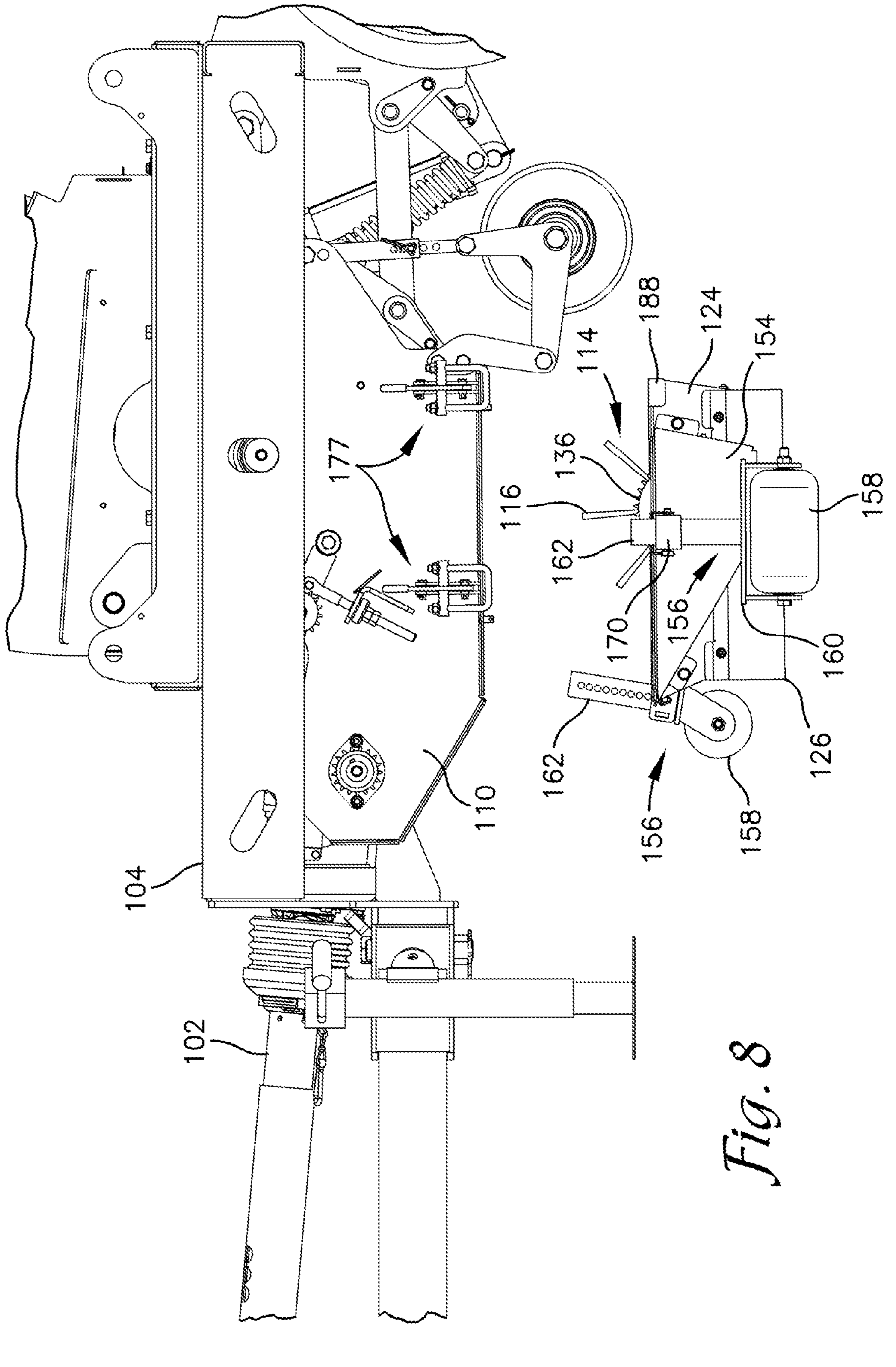
FIG. 8 is an enlarged fragmentary side view of the turf maintenance implement of FIG. 1 with the interchangeable tool housing in a detached state.

Upon removing the chain 132, the user may initially reinstall the lower shielding panel 154 then remove a first anti-scalp roller assembly 156, preferably the leftmost or rightmost roller assembly 156, from a primary mounting bracket 166, and then place the shank 162 of the same anti-scalp roller assembly 156 into one of the secondary mounting brackets 170 or 171 on the rotary tool housing 112, 212 or 312 and secure the roller assembly 156 in place. This may be done with locking pin 168, which may be similarly taken from the primary bracket 166 and inserted through the pin receiving holes 172 disposed on the secondary bracket 170 or 171 and a selected pin receiving hole 164 in the roller assembly shank 162. It may be advantageous for the user to secure the roller 158 at a relatively lower height in the secondary bracket 170 or 171 compared to the primary bracket 166, such that the roller 158 is closer to the ground than before, and, preferably, the lowermost point of the roller 158 is below the lowermost point of the housing skirt 126. The roller 158 is oriented substantially perpendicular to its original (primary) orientation, as shown in FIGS. 7 and 8. The user then repeats the sequence using a second roller assembly 156, preferably with the opposite outermost roller assembly 156, and places the secures the second roller assembly 156 in a second secondary mounting bracket 170 or 171 disposed on the opposite side of the turf maintenance implement 100 from the first secondary mounting bracket 170 or 171. After the two roller assemblies 156 are moved to their respective secondary brackets 170 and 171, the user then lowers the rotary tool housing 112, 212 or 312 such that the rollers 158 of the roller assemblies 156 secured in the secondary mounting brackets 170 and 171 are in contact with the ground.

With the rotary tool housing 112 now in contact with the ground (via the side-mounted rollers 158), the rotary tool housing 112 can be safely detached from the rest of the turf maintenance implement 100. This can be achieved by removing the upper pin 196 of each of the four respective latch assemblies 176 and pivoting the latch levers 182 outward and downward about the lower pivot pins 184 to advance the latch bails 186 downward and away from the catches 188. When this has been completed with each toggle latch mechanism 177, the rotary tool housing 112, 212, or 312 is completely detached from the debris loading duct 110.

The debris loading duct 110 may then be raised and the rotary tool housing 112, 212 or 312 rolled laterally out from under the debris loading duct 110 so that a second rotary tool housing 112, 212 or 312 with roller assemblies 156 attached to the left and right sides and with a different tool or replacement tool may be rolled under the debris loading duct 110 for attachment thereto.

For attachment of the second rotary tool housing 112, 212 or 312 to the debris loading duct 110, the above-described steps may be performed essentially in reverse. For example, the new rotary tool housing 112, 212 or 312 is rolled under the debris loading duct 110, the debris loading duct 110 is lowered to abut against the second rotary tool housing 112, 212 and 312 and then the latch levers 182 of the latch mechanisms 177 are pivoted upward to draw the associated latch bails 186 upward and into contact with a respective one of the catches 188. As the latch levers 182 are pivoted to the over-centered position the bails 186 draw the catches 188 and attached frame 120 upward against a lower end of the debris loading duct 110. The latch levers 182 are then secured in the over-centered position using locking pins 196. The side-mounted roller assemblies 156 in the secondary mounting brackets 170 and 171 may then be removed and placed in a respective one of the primary mounting brackets 166. The drive assembly 130 may then be re-engaged with the rotary tool 114, 214 or 314 as described above, before the debris loading duct 110 and attached rotary tool housing 112, 212, or 312 may then be lowered and the turf maintenance implement 100 may then resume operation using the new rotary tool housing 112, 212, or 312 and associated rotary tool 114, 214 or 314.

In an alternative embodiment, the same rotary tool housing 112 is used for each of the rotary tools 114, 214 and 314. After the rotary tool housing 112 is separated from the debris loading duct 110, as described previously, the rotary tool 114, 214 or 314 and the axle 118, 218 or 318 and attached sprocket 136 are removed from the frame 120 and replaced with different or replacement rotary tool 114, 214 or 314 and its axle 118, 218 or 318 and sprocket 136. The rotary tool housing 112 with the alternative or replacement rotary tool 114, 214 or 314 secured thereto is then reattached to the debris loading duct 110 as described previously.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed and desired to be secured by Letters Patent is as follows:

1. A turf maintenance implement, comprising:
- a frame;
- a hopper assembly mounted to the frame;
- a debris loading duct connected to the frame and in communication with the hopper assembly, the debris loading duct having a first portion of at least one releasable connector connected thereto;
- a rotary tool housing having a rotary tool rotatably mounted thereto, the rotary tool housing having a second portion of the at least one releasable connector connected thereto, the rotary tool housing selectively suspended from the debris loading duct by connecting the second portion of the at least one releasable connector connected thereto to the first portion of the at least one releasable connector connected to the debris loading duct, and the rotary tool housing detachable from the debris loading duct by releasing the first portion of the at least one releasable connector from the second portion of the at least one releasable connector; and
- a drive assembly connectable to a power source and drivingly and releasably connected to the rotary tool.

2. The turf maintenance implement as in claim 1 wherein the rotary tool is selected from a group consisting of: a rotary broom, a flail rotor, and a verticut rotor.

3. The turf maintenance implement as in claim 1, wherein the at least one releasable connector comprises a latch and the first portion is an over-center latch mechanism and the second portion is a catch engageable by the over-center latch mechanism.

4. The turf maintenance implement as in claim 1 wherein at least one height adjustable roller is connected to the rotary tool housing in spaced relation in front of the rotary tool housing.

5. The turf maintenance implement as in claim 1, wherein the rotary tool implement is configured to be towed behind a vehicle, and the power source is a power take-off connected to the vehicle.

6. A turf maintenance implement, comprising:
- a frame;
- a hopper assembly mounted to the frame;
- a debris loading duct connected to the frame and in communication with the hopper assembly, the debris loading duct having a first portion of at least one releasable connector connected thereto;
- a rotary tool housing having a rotary tool rotatably mounted thereto, the rotary tool housing having a second portion of the at least one releasable connector connected thereto, the rotary tool housing selectively detachable from the debris loading duct by releasing the first portion of the at least one releasable connector from the second portion of the at least one releasable connector; and
- a drive assembly connectable to a power source and drivingly and releasably connected to the rotary tool; wherein
- the rotary tool housing further includes a plurality of primary mounting brackets disposed along a front wall of the rotary tool housing, a left-side secondary mounting bracket disposed along a left-hand side of the rotary tool housing and a right-side secondary mounting bracket disposed along a right-hand side of the rotary tool housing, each of the primary and secondary mounting brackets configured to hold a roller assembly including a roller.

7. The turf maintenance implement as in claim 6, wherein each roller assembly includes an elongate shank having a plurality of vertically spaced pin receiving holes formed therein, such that the roller is height-adjustable.

8. The turf maintenance implement as in claim 6, wherein each of the left-side secondary mounting bracket and the right-side secondary mounting bracket are configured to hold the roller of the roller assemblies secured thereto in a substantially perpendicular orientation relative to the orientation of the roller of the roller assemblies held by the primary mounting brackets.

9. A turf maintenance implement for removing and collecting landscape debris from the ground, comprising:

a hopper assembly pivotally connected to a frame, the hopper assembly being configured to hold landscape debris therein;

a debris loading duct connected to and in communication with the hopper assembly, the debris loading duct being height-adjustable relative to the frame and having a first portion of at least one releasable connector disposed on a perimeter thereof;

a rotary tool housing comprising:

a rotary tool rotatably mounted thereto;

a flexible skirt extending downwardly along a perimeter thereof; and a second portion of the at least one releasable connector disposed on a perimeter thereof; and a drive assembly connectable to a power source and drivingly and releasably connected to the rotary tool;

wherein the rotary tool housing is selectively attachable to and suspended from the debris loading duct by connecting the first portion of the at least one releasable connector to the second portion of the at least one releasable connector, and the rotary tool housing is selectively detachable from the debris loading duct by releasing the first portion of the at least one releasable connector from the at least one second portion of the at least one releasable connector; and wherein the debris loading duct and the rotary tool housing are height-adjustable relative to the frame.

10. The turf maintenance implement as in claim 9, wherein the first portion is an over-center latch mechanism and the second portion is a catch engageable by the over-center latch mechanism.

11. The turf maintenance implement as in claim 9, wherein the at least one releasable connector is a first portion and a second portion of a first releasable connector disposed on a left-hand side of the debris loading duct and a left-hand side of the rotary tool housing and a first portion and a second portion of a second releasable connector disposed on a right-hand side of the debris loading duct and a right-hand side of the rotary tool housing.

12. The turf maintenance implement as in claim 9 wherein at least one height adjustable roller is connected to the rotary tool housing in spaced relation in front of the rotary tool housing.

13. A turf maintenance implement for removing and collecting landscape debris from the ground, comprising:

a hopper assembly pivotally connected to a frame, the hopper assembly being configured to hold landscape debris therein;

a debris loading duct connected to and in communication with the hopper assembly, the debris loading duct being height-adjustable relative to the frame and having a first portion of at least one releasable connector disposed on a perimeter thereof;

a rotary tool housing comprising:

a rotary tool rotatably mounted thereto;

a flexible skirt extending downwardly along a perimeter thereof; and a second portion of the at least one releasable connector disposed on a perimeter thereof; and a drive assembly connectable to a power source and drivingly and releasably connected to the rotary tool;

wherein:

the rotary tool housing is selectively detachable from the debris loading duct by releasing the first portion of the at least one releasable connector from the at least one second portion of the at least one releasable connector;

the debris loading duct and the rotary tool housing are height-adjustable relative to the frame; and the rotary tool housing further includes a plurality of primary mounting brackets disposed along a front wall of the rotary tool housing, a left-side secondary mounting bracket disposed along a left-hand side of the rotary tool housing and a right-side secondary mounting bracket disposed along a right-hand side of the rotary tool housing, each of the primary and secondary mounting brackets configured to hold a roller assembly including a roller.

14. The turf maintenance implement as in claim 13, wherein each of the left-side and right-side secondary mounting brackets are each configured to hold the roller of the roller assemblies secured thereto in a substantially perpendicular orientation relative to the orientation of the roller of the roller assemblies held by the primary mounting brackets.

15. The turf maintenance implement as in claim 13, wherein the roller is height-adjustable relative to the rotary tool housing.

16. The turf maintenance implement as in claim 9, wherein the turf maintenance implement is configured to be towed behind a vehicle, and the power source is a power take-off connected to the vehicle.

17. A method of removing a rotary tool of a turf maintenance implement, the method comprising:

providing a turf maintenance implement configured to remove landscape debris from the ground, the turf maintenance implement comprising:

a height-adjustable debris loading duct connected to a hopper assembly, the debris loading duct having a first portion of at least one releasable connector;

a first rotary tool housing having a rotary tool rotatably mounted thereto, the first rotary tool housing having a second portion of the at least one releasable connector connected thereto with the second portion connected to the first portion of the at least one releasable connector, a left-side roller mounted on a left-hand side of the first rotary tool housing and a right-side roller mounted on a right-hand side of the first rotary tool housing; and a drive assembly connectable to a power source and drivingly and releasably coupled to the rotary tool;

decoupling the drive assembly from the rotary tool;

positioning the first rotary tool housing such that the left-side roller and the right-side roller are in contact with the ground;

decoupling the first portion of the at least one releasable connector from the second portion of the at least one releasable connector; and rolling the first rotary tool housing with the first rotary tool rotatably mounted therein laterally out from under the debris loading duct on the at least one left-side roller and the at least one right-side roller.

18. The method as in claim 17 further comprising:

providing a second rotary tool housing having a second rotary tool rotatably mounted thereto, the second rotary tool housing having a second portion of the at least one releasable connector connected thereto, a left-side roller mounted on a left-hand side of the second rotary tool housing and a right-side roller mounted on a right-hand side of the second rotary tool housing;

rolling the second rotary tool housing with the second rotary tool rotatably mounted therein laterally under the debris loading duct such that the first portion of the at least one releasable connector disposed on the debris loading duct is vertically aligned with the second portion of the at least one releasable connector disposed on the second rotary tool housing;

adjusting the height of the debris loading duct until the debris loading duct abuts the second rotary tool housing;

coupling the first portion of the at least one releasable connector disposed on the debris loading duct to the second portion of the at least one releasable connector disposed on the second rotary tool housing; and coupling the drive assembly to the second rotary tool.

19. The method as in claim 18 further comprising:

removing the left-side roller from the left-hand side of the second rotary tool housing and mounting the left-side roller to extend in front of the second rotary tool housing; and removing the right-side roller from the right-hand side of the secondary rotary tool housing and mounting the right-side roller to extend in front of the second rotary tool housing.

20. A turf maintenance implement, comprising:

a frame;

a hopper assembly mounted to the frame;

a debris loading duct connected to the frame and in communication with the hopper assembly; and a rotary tool housing having a rotary tool rotatably mounted thereto, the rotary tool housing removably connected to and suspended from the debris loading duct the rotary tool housing further includes a plurality of primary mounting brackets disposed along a front wall of the rotary tool housing, a left-side secondary mounting bracket disposed along a left-hand side of the rotary tool housing and a right-side secondary mounting bracket disposed along a right-hand side of the rotary tool housing, each of the primary and secondary mounting brackets configured to hold a roller assembly including a roller.

* * * * *